June 12, 1923.

A. BRIGDEN

BOLL WEEVIL MACHINE

Filed Aug. 12, 1922

Arthur Brigden
INVENTOR

WITNESSES
Frank B. Cook
Harry E. Seidel

BY
E. G. Siggers
ATTORNEY

June 12, 1923.

A. BRIGDEN

BOLL WEEVIL MACHINE

Filed Aug. 12, 1922

Arthur Brigden
INVENTOR

WITNESSES
Frank B. Cook
Harry E. Seidel

BY

ATTORNEY

Patented June 12, 1923.

1,458,799

UNITED STATES PATENT OFFICE.

ARTHUR BRIGDEN, OF BIRMINGHAM, ALABAMA.

BOLL-WEEVIL MACHINE.

Application filed August 12, 1922. Serial No. 581,480.

*To all whom it may concern:*

Be it known that ARTHUR BRIGDEN, a citizen of the United States, residing at Birmingham, in the county of Jefferson and State of Alabama, has invented a new and useful Boll-Weevil Machine, of which the following is a specification.

This invention relates to improvements in boll weevil machines such as described and claimed in my co-pending application filed February 14, 1922, Serial Number 536,601, and has for its object the provision of a new and improved auxiliary device adapted to be used on the above-mentioned boll weevil machine for dislodging the weevil from cotton plants in their earlier stages of growth.

The invention further contemplates the provision of a new and improved auxiliary frame provided with depending fingers for agitating young cotton plants to dislodge boll weevils, which frame is capable of vertical adjustment, and adapted to be oscillated transversely of the machine and between the fingers of the boll weevil machine as originally constructed when said fingers are placed in an inoperative position, the auxiliary frame being removable when the plants have reached a certain stage of growth.

The subject-matter of the present application is similar in some respects to the construction shown in my co-pending application, Serial No. 584,969, filed August 29, 1922, and certain of the claims herein are generic to the structure shown in said co-pending application.

This invention will be best understood from a consideration of the following detailed description taken in connection with the accompanying drawing forming part of this specification, with the understanding, however, that the invention is not confined to any strict conformity with the showing in the drawing, but may be changed and modified so long as such changes and modifications mark no material departure from the salient features of the invention as expressed in the appended claims.

In the drawings:—

Figure 1:
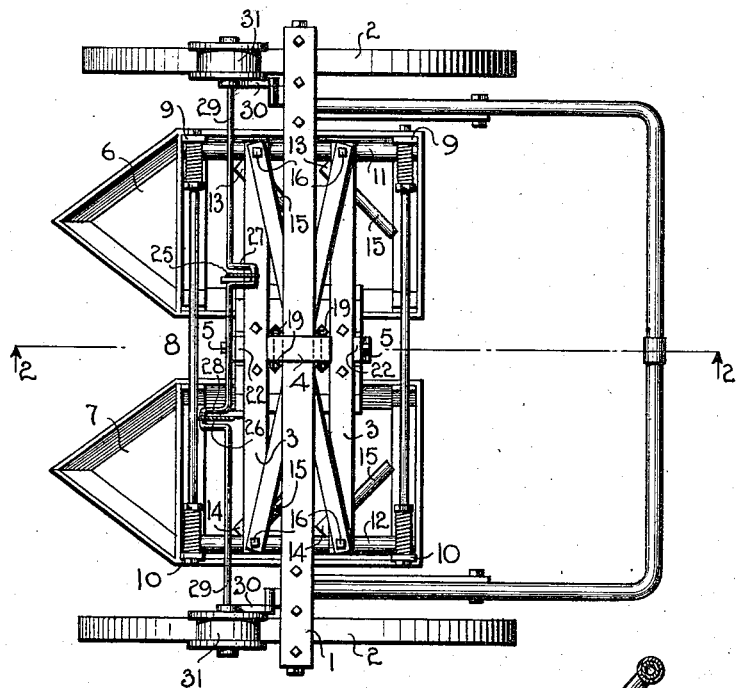
Fig. 1 is a plan view of the wheel-supporting frame with my invention applied thereto.

Referring to the drawings, 1 designates a main frame supported by and adapted to be carried along rows of cotton plants by means of the wheels 2. A second frame 3 is mounted on frame 1 and is adapted to be adjusted vertically through the U-shaped strap 4 and bolts 4ª. The strap is pivoted adjacent its lower end on bolts 5 which are secured transversely of the frame 3.

Supported by the frame 3 and extending longitudinally of the main frame are troughs 6 and 7 spaced from each other to provide a path 8 between the troughs, to permit rows of cotton plants to pass between the troughs when the wheel-supporting frame is movable along a row. These troughs are secured at their longitudinal sides to the depending side members 9 and 10. Longitudinal bars 11 and 12, which are secured to the side members 9 and 10, are provided with depending brackets 13 and 14 spaced at intervals along the bars and to which are secured the horizontal flexible fingers 15 normally extending transversely over and above the troughs 6 and 7 for engaging the cotton plants when the boll weevil machine is moved along a row. The fingers maintain said plants in a constant state of vibration to dislodge the boll weevils and precipitate them into the troughs 6 and 7. The device just described forms the subject matter of my co-pending application referred to above, and is adapted to free the cotton plants of boll weevils after the plants have reached a certain size.

In order to more effectively agitate cotton plants which are in the earlier stages of growth, and which are too small to be maintained in a state of vibration by the device described, I have provided an auxiliary means which will be more effective for the purpose, since the additional structure is suspended directly into the path of the young plants and closer to the troughs 6 and 7.

The brackets 13 and 14 may be revolved on the bolts 16 in order to move the fingers 15 carried by the brackets in substantially a longitudinal position with respect to the main frame 1.

Figure 6:
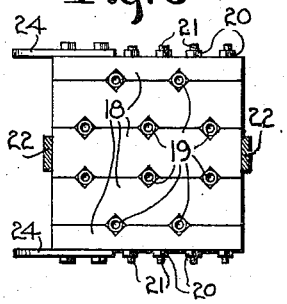
Fig. 6 is a plan view of the same.

The auxiliary device comprises a frame 17 formed of a plurality of small sections or strips of material 18, with corresponding semi-circular notches in the adjacent edges of the strips to receive the upper ends of the resilient fingers 19 between the cooperating notches, so that when nuts 20 are screwed up tightly on bolts 21, which pass transversely through passages in the strips, the fingers will be securely locked in the frame 17. As shown in Fig. 6, parallel rows of vertical fingers are disposed longitudinally of the frame 17 with the fingers of each row located in staggered relation with the fingers of an adjacent row, (Fig. 6). This staggering of the fingers insures that all branches of the young plants shall be engaged by the resilient fingers and agitated as the fingers are moved through the plants, for effectively dislodging the boll weevils infesting said plants.

The resilient fingers 15 and 19 are of the same construction as the fingers described in my co-pending application, and therefore no description of the same will be given in this case.

Figure 2:
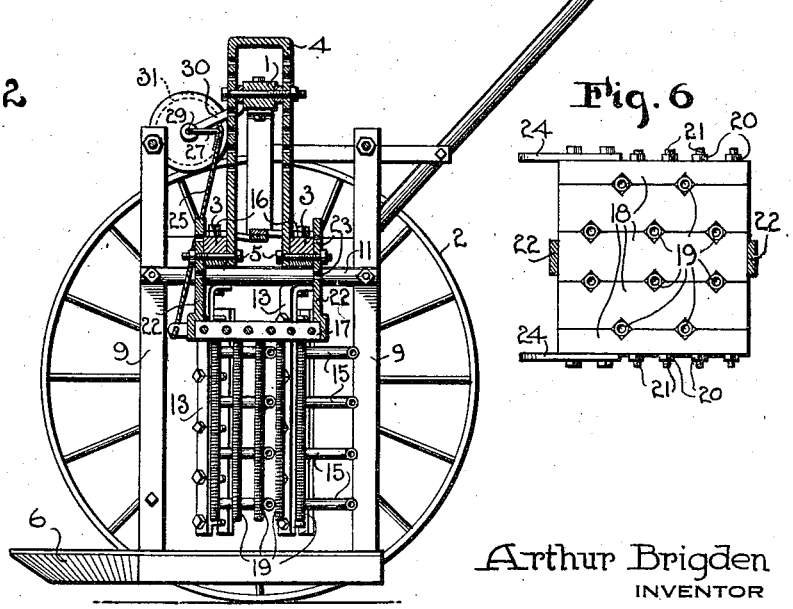
Fig. 2 is a transverse vertical section taken along the line 2—2 of Fig. 1.

Secured to the opposite ends of the frame 17 are strap irons 22 with perforations 23 adapted to be received by the bolts 5, in such a manner that the lower ends of the resilient fingers 19 may be adjusted to any height above the troughs 6 and 7, as desired. As shown in Fig. 2, two of these straps are employed at each end of the frame 17. The mounting of the straps on the bolts 5 permits rocking of the frame 17 and likewise the fingers 19 transversely of the machine and the longitudinally disposed troughs, and transversely of the path 8 between said troughs. Projecting outwardly from the forward edge of the frame 17 are perforated brackets 24 adapted to receive one end of links or cables 25 and 26 with the upper ends of the said cables respectively connected to the cranks 27 and 28.

These cranks are disposed at 180° apart and are formed integrally with the crank shaft 29, with the opposite ends of the shaft mounted in bearings on the ends of brackets 30, which are pivoted to the main frame 1.

Rigidly secured to the outer ends of the shaft 29 and adjacent the brackets 30 are grooved wheels or rollers 31 adapted to engage the wheels 2 which support the frame 1, and when the boll weevil machine is moved along the rows of plants, the revolving wheels 2 will cause rotation of the wheels 31 and the shaft 29.

Figure 3:
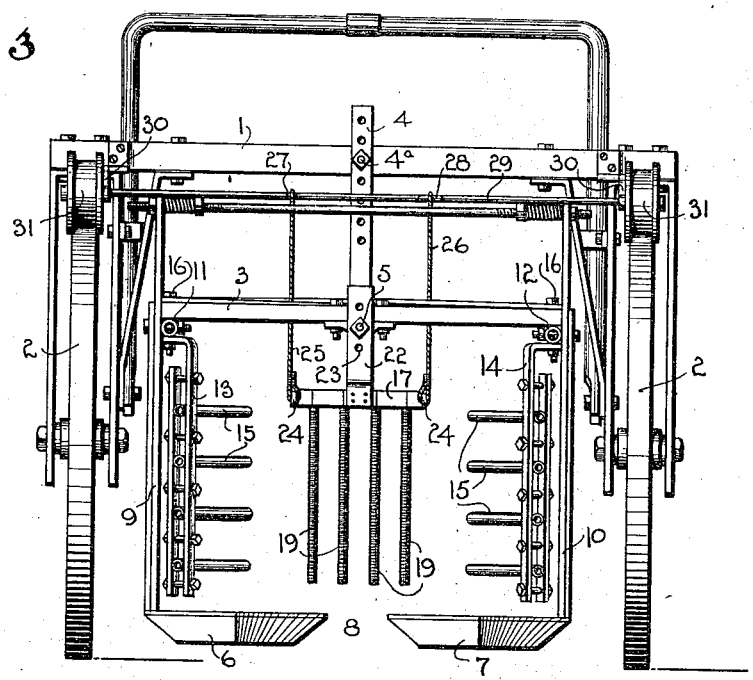
Fig. 3 is a front elevation of the same.
Figure 4:
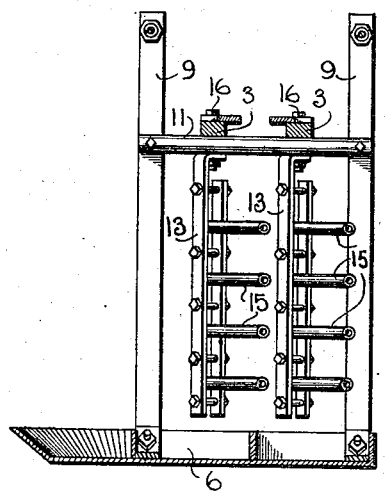
Fig. 4 is a longitudinal section of the supporting frame with parts removed.
Figure 5:
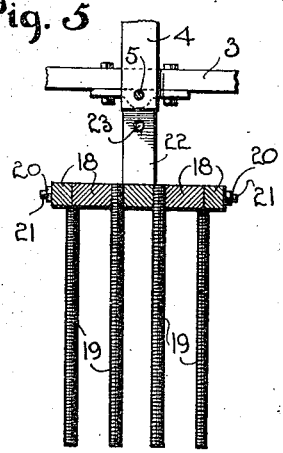
Fig. 5 is a fragmentary view in section of the attachment embodying my invention.

In the operation of my device, the troughs 6 and 7 are filled with an insect-destroying liquid, and the resilient fingers 15, through the brackets 13, are positioned substantially longitudinally of the wheel-supporting frame, as shown in Fig. 3, with the depending fingers 19 located in a vertical position and suspended above the troughs 6 and 7 and over the path 8 between the troughs. The machine is ready for action and movement along the rows for dislodging the boll weevils from the cotton plants, when they are in their earlier stages of growth. As the device is pushed or drawn along the rows, the wheels 2 are revolved, rotating the engaging rollers 31, revolving the shaft 29 and operating the cranks 27 and 28. The cables 25 and 26, which are connected to the cranks 27 and 28, are reciprocated vertically but in opposite directions by the cranks, whereby the frame 17 is rocked with the resilient fingers 19 oscillating transversely of the path 8 and above the troughs 6 and 7. The small cotton plants, which are in the path of the rocking fingers 19, with the troughs 6 and 7 located on opposite sides of the plants, are thoroughly agitated by the fingers sufficiently to dislodge the boll weevils infesting the plants and precipitating them in the troughs 6 and 7.

After the plants have reached a predetermined height, where the fingers 15 will be more effective for dislodging the boll weevils with less danger of injury to the plants, the frame 17 is removed and the depending brackets 13 and 14 are swung to a position on the bolts 16 for projecting the fingers 15 transversely of the wheel-supporting frame.

What is claimed is:

1. A device of the class described, comprising a wheeled supporting frame, a separate frame supported thereby and carrying depending substantially parallel fingers arranged in longitudinal rows, the fingers of each row being staggered with respect to those of an adjacent row, a pair of connecting members connected to the separate frame on opposite sides of its pivot, and means for pulling on each of the connecting members alternately to oscillate the fingers transversely of the supporting frame.

2. A device of the class described comprising a wheeled supporting frame, an auxiliary frame pivotally supported by the wheeled frame and including a plurality of strips arranged in a plane and bolts extending through the strips from side to side to clamp the same together, a plurality of depending fingers clamped between the strips, and means operatively connecting the auxiliary frame with the wheels of the supporting frame for rocking said auxiliary frame to oscillate the depending fingers transversely of the supporting frame.

3. A device of the class described, comprising a wheeled supporting frame, an auxiliary frame pivotally supported on the wheeled frame and provided with substantially parallel depending fingers, troughs supported below and upon opposite sides of the depending fingers, a pair of connecting members connected to the auxiliary frame on opposite sides of its pivot, and means operatively connected with the wheels of the supporting frame and operable to pull on said connecting members alternately to oscillate said fingers transversely of the troughs as the machine travels over the field.

4. A device of the class described comprising a wheeled supporting frame, an auxiliary frame pivotally supported by the wheeled frame and including a plurality of strips arranged in a plane, bolts extending through the strips from side to side to clamp the same together, a plurality of rows of depending fingers clamped between the strips, the fingers of one row being staggered with respect to those of an adjacent row, troughs supported below the depending fingers and spaced from each other with the depending fingers suspended above the space between the troughs, and means operatively connecting the auxiliary frame with the wheels of the supporting frame for rocking the depending fingers transversely across the space between the troughs.

5. A device of the class described, comprising a wheeled supporting frame adapted to straddle a row of plants, a separate frame depending from and adjustable vertically on the supporting frame, a depending auxiliary frame pivotally supported by said separate frame and having substantially parallel depending fingers arranged in longitudinal rows, the fingers of one row being staggered with respect to those of an adjacent row, troughs supported longitudinally of the separate frame, on either side of the auxiliary frame, and means operatively connected to opposite sides of the auxiliary frame and alternately actuated by the wheels of the supporting frame for rocking the depending fingers transversely across the space between the troughs as the machine travels over the field.

6. A device of the class described comprising a wheeled supporting frame, a second frame carrying fingers and troughs with the fingers adapted to be positioned transversely of the frame and movable to an inoperative position, a third frame provided with depending fingers and pivotally mounted on the second frame, and means operatively connected with the third frame for oscillating the fingers transversely of the troughs, when the transversely disposed fingers of the second-mentioned frame are located in an inoperative position.

7. A device of the class described, comprising a wheel-supported frame adapted to straddle a row of plants, hangers supported by the frame, horizontally-projecting opposed fingers carried by the hangers, said hangers being adjustable to move the fingers to an inoperative position, a series of fingers depending between the opposed horizontal fingers and terminating below the majority of the horizontal fingers, and means for oscillating said depending fingers as the machine travels through the field.

8. A device of the class described, comprising a wheel-supported frame adapted to straddle a row of plants, a pair of oppositely-disposed hangers supported by the frame and each having a series of horizontal fingers extending toward the fingers of the other hanger to agitate the taller plants, a detachable oscillatory frame having fingers depending between the series of horizontal fingers and extending below a majority of the horizontal fingers to reach the shorter immature plants, and means for oscillating the last-mentioned frame as the machine travels through the field.

9. A device of the class described, comprising a wheel-supported frame adapted to straddle a row of plants, a pair of oppositely-disposed hangers supported by the frame, each having a series of horizontal fingers, the fingers of one hanger extending obliquely toward the fingers of the other hanger to agitate the taller plants, said hangers being adjustable to vary the distance between the two series of fingers or to swing the fingers into inoperative position, a detachable frame having fingers depending between the series of horizontal fingers and extending below the greater portion thereof to reach the shorter immature plants, and means for oscillating the last-mentioned frame as the machine travels through the field.

10. A device of the class described comprising a wheeled supporting frame, an auxiliary frame supported for oscillation transversely of the wheeled frame and having depending fingers secured thereto, a transversely extending crank shaft operatively connected to the wheels, said crank shaft having oppositely disposed cranks, and cables connecting said cranks to the auxiliary frame at opposite sides of its pivot whereby to oscillate said auxiliary frame as the machine advances over the field.

11. A device of the class described comprising a wheeled supporting frame, an auxiliary frame supported for oscillation transversely of the wheeled frame and having depending fingers, a transversely extending crank shaft having drive wheels frictionally connected to the wheel treads of the wheeled frame, said crank shaft having cranks at equal distances on opposite sides of the pivot of the auxiliary frame, said cranks extending in opposite directions from the axis of the crank shaft, and cables connecting said cranks to the auxiliary frame at opposite sides of its pivot whereby to oscillate said auxiliary frame as the machine advances over the field.

12. A device of the class described, comprising a wheeled supporting frame, an auxiliary frame supported for oscillation transversely of the wheeled frame and having depending fingers secured thereto, a transversely-extending shaft having a floating support, drive wheels secured to the shaft and held by gravity in operative connection with the ground wheels, means connected to the auxiliary frame at opposite sides of its pivot and alternately actuated by the rotation of said shaft to oscillate said auxiliary frame as the machine advances over the field.

13. A device of the class described comprising a wheeled supporting frame, an auxiliary frame supported for oscillation transversely of the wheeled frame and having depending fingers secured thereto, a transversely extending floating shaft having wheels thereon which rest by gravity on the treads of the ground wheels to be driven thereby, and means operable by the rotation of said shaft to oscillate said auxiliary frame as the machine advances over the field.

14. A device of the class described comprising a frame, wheels supporting the frame, a crank shaft mounted for rotation on the frame and provided with a plurality of cranks, rollers on the shaft operatively engaged by the wheels of the supporting frame, a frame pivotally connected to the supporting frame, links connecting the ends of the last-mentioned frame with the respective cranks of the shaft, troughs supported in spaced relation to each other and longitudinally of the supporting frame, resilient fingers depending from the second frame adapted to be rocked transversely of the troughs through the links and shaft when the supporting frame is transported by the wheels.

In testimony that I claim the foregoing as my own, I have hereto affixed my signature.

ARTHUR BRIGDEN.